(12) United States Patent
Liu et al.

(10) Patent No.: US 11,974,322 B2
(45) Date of Patent: Apr. 30, 2024

(54) METHOD AND DEVICE FOR SENDING INFORMATION, AND METHOD AND DEVICE FOR RECEIVING INFORMATION

(71) Applicant: ZTE Corporation, Shenzhen (CN)

(72) Inventors: Kun Liu, Shenzhen (CN); Bo Dai, Shenzhen (CN); Weiwei Yang, Shenzhen (CN); Huiying Fang, Shenzhen (CN); Luanjian Bian, Shenzhen (CN); Youjun Hu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 491 days.

(21) Appl. No.: 17/280,306

(22) PCT Filed: Sep. 29, 2019

(86) PCT No.: PCT/CN2019/108860
§ 371 (c)(1),
(2) Date: Mar. 26, 2021

(87) PCT Pub. No.: WO2020/063943
PCT Pub. Date: Apr. 2, 2020

(65) Prior Publication Data
US 2022/0039168 A1    Feb. 3, 2022

(30) Foreign Application Priority Data
Sep. 28, 2018   (CN) .......................... 201811143126.9

(51) Int. Cl.
*H04W 74/08* (2009.01)
*H04W 74/0833* (2024.01)

(52) U.S. Cl.
CPC ............................... *H04W 74/0833* (2013.01)

(58) Field of Classification Search
CPC ........... H04W 74/0833; H04W 74/006; H04W 52/0229; H04W 76/27; H04W 52/0212; H04W 72/1268; Y02D 30/70
See application file for complete search history.

(56) References Cited

U.S. PATENT DOCUMENTS

2011/0299415 A1* 12/2011 He ................... H04W 74/0833
370/252
2014/0044088 A1* 2/2014 Nogami ............... H04L 5/0035
370/329
(Continued)

FOREIGN PATENT DOCUMENTS

CN          101772184 A       7/2010
CN          101841889 A       9/2010
(Continued)

OTHER PUBLICATIONS

International Search Report for corresponding application PCT/CN2019/108860 filed Sep. 29, 2019; dated Jan. 2, 2020.
(Continued)

*Primary Examiner* — Kiet Tang
(74) *Attorney, Agent, or Firm* — CANTOR COLBURN LLP

(57) ABSTRACT

Provided are a method and device for sending information, and a method and device for receiving information. The method includes: a base station sends first information to a terminal over a downlink channel, wherein the first information include one of the following: information for triggering a random access procedure, and Msg4 in a random access process.

17 Claims, 6 Drawing Sheets

(56) References Cited

U.S. PATENT DOCUMENTS

| | | | | |
|---|---|---|---|---|
| 2014/0307663 A1* | 10/2014 | Huang | ............... | H04W 72/1268 370/329 |
| 2016/0095154 A1* | 3/2016 | Palm | ................. | H04W 74/0833 370/329 |
| 2019/0173522 A1* | 6/2019 | Sun | ....................... | H04B 1/7156 |

FOREIGN PATENT DOCUMENTS

| | | |
|---|---|---|
| CN | 104581925 A | 4/2015 |
| CN | 108521889 A | 9/2018 |
| WO | 2015098745 A1 | 7/2015 |

OTHER PUBLICATIONS

Andreas Hoglund, "3GPP Release 15 Early Data Transmission", IEEE Communications Standards Magazine, Jun. 2018.
European Search Report for corresponding application EP19867739; dated Feb. 24, 2022.
LG Electronics, "Data transmission during random access procedure in MTC", 3GPP TGS RAN WGI Meeting #90, Prague, Czech Republic Aug. 21-25, R1-1713099.
ZTE, Consideration on Early Data Transmission in FeNB-IOT, 3GPP TSG RAN WG2 Meeting#99 Berlin Germany, Aug. 21-25, 2017.

* cited by examiner

A base station sends first information to a terminal over a downlink channel — S102

METHOD AND DEVICE FOR SENDING INFORMATION, AND METHOD AND DEVICE FOR RECEIVING INFORMATION

The present disclosure claims priority to Chinese Patent Application No. 201811143126.9, filed with the State Intellectual Property Office of the People's Republic of China on Sep. 28, 2018, which is incorporated herein by reference in its entirety.

TECHNICAL FIELD

The present disclosure relates to the field of communications, and for example, to a method and device for sending information, and a method and device for receiving information.

BACKGROUND

With the development of intelligent terminals and the richness of wireless data application services, the number of data users in a wireless communication network is greatly increased, wireless data content is no longer limited to traditional texts or images, and more and more multimedia service content such as high definition video and mobile television is included, resulting in an explosive increase in traffic of the wireless communication network. Mobile Internet and Internet of Things services will become the main driving force for mobile communication development.

For the Internet of Things, the 3rd Generation Partnership Project (3GPP) standards organization develops two very typical communication standard protocols, specifically, Machine Type Communication (MTC) and Narrow Band Internet of Things (NB-IoT).

Considering that relatively small transmission data packets and sending at intervals are typical services of user equipment (UE) in MTC and NB-IoT, Early Data Transmission (EDT) technique is introduced in the version of MTC and NB-IoT communication standard protocol Release 15, i.e. UE is allowed to use Msg3 (Msg3) to transmit data to a base station in procedures related to random access. In this way, the UE may directly transmit data to the base station in a Radio Resource Control IDLE (RRC-IDLE) state without the need of entering a Radio Resource Control CONNECT (RRC-CONNECT) state. However, data transmission using the EDT technique in the related art will cause high power consumption of the UE.

SUMMARY

Embodiments of the present disclosure provide a method and device for sending information, and a method and device for receiving information.

Provided is a method for sending information, and the method may include: a base station sends first information to a terminal over a downlink channel, wherein the first information include one of the following: information for triggering a random access procedure, and a Msg4 in a random access process.

Also provided is a method for receiving information, and the method may include: a terminal initiates a random access procedure, and the random access procedure is triggered by at least one of the following: triggered by the terminal, and triggered by first information sent by a base station to the terminal.

Also provided is a method for receiving information, and the method may include: a terminal receives second information sent by a base station over a downlink channel. The second information indicates at least one of the following: data sent on a second-type channel needs to be retransmitted, triggering a contention-based random access procedure, and triggering a non-contention-based random access procedure. The downlink channel is at least one of the following: a downlink control channel and a downlink shared channel. The downlink control channel is a downlink control channel configured by the base station for the second-type channel, and the downlink control channel is used for indicating scheduling information about the downlink shared channel.

Also provided is a method for sending information, and the method may include: before a terminal sends uplink data on a third-type channel, the terminal sends a first signal on a fourth-type channel. The first signal is used for notifying a base station that the uplink data will be sent on the third-type channel, resources occupied by the fourth-type channel and resources occupied by the third-type channel correspond to a time-domain interval therebetween, and the time-domain interval has a length greater than or equal to 0; or resources occupied by the fourth-type channel are located in resources occupied by the third-type channel.

Also provided is a wireless communication device, and the method may include a processor configured to execute the above mentioned method for sending and receiving information.

Also provided is a storage medium. The storage medium stores a computer program, and the computer program, when running, is configured to execute the described information sending method and information receiving method.

According to the present disclosure, the base station sends the first information to the terminal on the downlink channel, wherein the first information comprises one of the following: information for triggering a random access procedure, and a Msg4 in a random access process. The present disclosure solves the problem of high power consumption of UE in the related art in data transmission, and also reduces the complexity of base station receiving detection, and achieves flexible conversion with EDT.

DETAILED DESCRIPTION OF THE EMBODIMENTS

The present disclosure will be described below with reference to the drawings and embodiments in detail.

In the related art, EDT can only support user equipment (UE) to send a data packet to a base station, and when the UE has multiple data packets to be sent at intervals, this is not supported by the EDT function. Meanwhile, as EDT needs to send data in Msg3 (Msg3) in a random access process, before Msg3 in the random access process, UE also needs to send a Physical Random Access Channel Preamble (PRACH Preamble, also referred to as Msg1) to a base station and receive a Random Access Response (also referred to as Msg2) sent by the base station. Every time EDT sends a data packet, the UE needs to send Msg1 and receive Msg2, resulting in high power consumption of the UE.

Embodiment 1

Figures 1, 2:
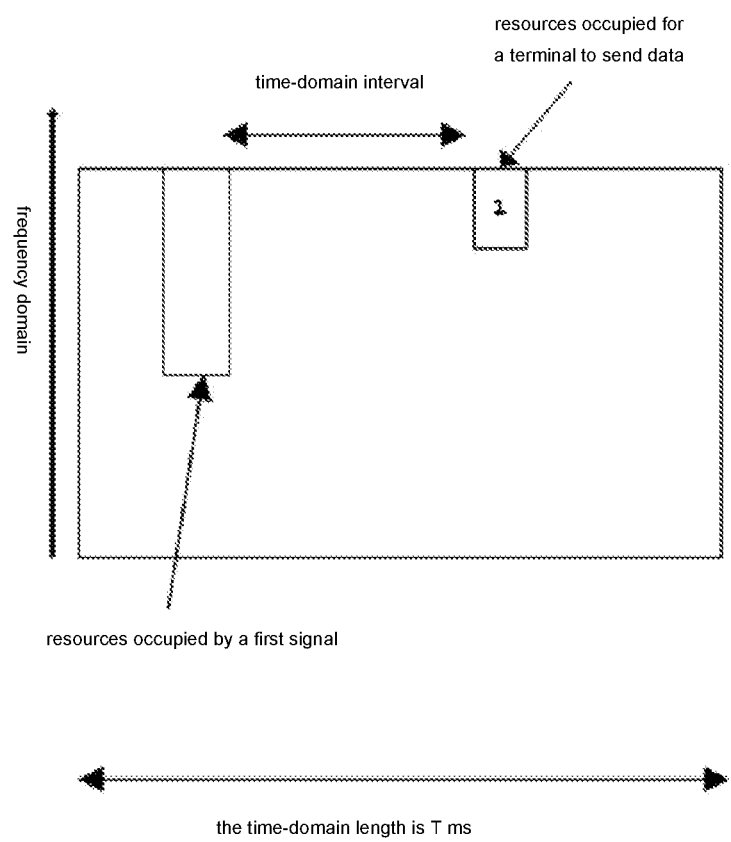
FIG. 1 is a flow diagram of a method for sending information according to an embodiment of the present disclosure.
FIG. 2 is a schematic diagram I of resources occupied by a first signal according to an embodiment of the present disclosure.

The present embodiment provides a method for sending information. FIG. 1 is a flow diagram of a method for sending information according to an embodiment of the present disclosure. As shown in FIG. 1, the method comprises the following step.

Step S102: a base station sends first information to a terminal over a downlink channel. The first information comprises one of the following: information for triggering a random access procedure, and a Msg4 in a random access process.

In an implementation, the random access procedure involved in the present embodiment comprises at least one of the following: a contention-based random access procedure and a non-contention-based random access procedure.

In an implementation of the present embodiment, that a terminal initiates a contention-based random access procedure or non-contention-based random access procedure may comprise the following two manners.

Manner 1: configuring random access sequence index information in first information, and instructing, by means of the random access sequence index information, a terminal to initiate a non-contention-based random access procedure or a contention-based random access procedure. For example, when the random access sequence index is 0, the terminal is instructed to initiate a contention-based random access procedure; and when the random access sequence index is not 0, the terminal is instructed to initiate a non-contention-based random access procedure, and a random access sequence to be used is indicated by the random access sequence index.

In an implementation, the downlink channel is a downlink control channel. The first information is a Physical Downlink Control Channel order (PDCCH order), i.e. a sending format of Downlink Control Information (DCI) to trigger a random access.

Manner 2: configuring index information about a random access channel in first information, and instructing, by means of the index information about the random access channel, a terminal to initiate a non-contention-based random access procedure or a contention-based random access procedure. For example, when the index information about the random access channel is 0, the terminal is instructed to initiate a contention-based random access procedure; and when the index of the random access channel is not 0, the terminal is instructed to initiate a non-contention-based random access procedure, and resources of the random access channel to be used are indicated by the index of the random access channel.

In an implementation, the downlink channel is a downlink control channel. The first information is a PDCCH order.

In an implementation of the present embodiment, when the first information is information for triggering a random access procedure, the first information may further comprise a first information element. The first information element indicates at least one of the following: first content, and second content.

The first content is at least one of the following: a Msg3 bears uplink data transmission in a random access process, EDT is supported in a random access process, information about a random access sequence or random access channel corresponding to the Msg3 bearing uplink data transmission, and information about a corresponding random access sequence or random access channel supporting EDT.

The second content is at least one of the following: the Msg3 does not bear uplink data transmission in a random access process, EDT is not supported in a random access process, information about a random access sequence or random access channel corresponding to the Msg3 not bearing uplink data transmission, and information about a corresponding random access sequence or random access channel not supporting EDT.

It should be noted that the random access procedure involved in the present embodiment may be a contention-based random access procedure.

On this basis, when the first information is the Msg4 in a random access process, the first information comprises a second information element.

The second information element indicates at least one of the following: releasing resources occupied by a first-type channel, and the resources occupied by the first-type channel continue to be valid. The resources occupied by the first-type channel continuing to be valid means that the first-type channel previously configured by the base station may continue to be used, and the terminal may also use the first-type channel to send uplink data.

It should be noted that the first-type channel previously configured by the base station may continue to be used, and the terminal may also use the first-type channel to send uplink data.

The first-type channel is a channel configured by the base station for the terminal to transmit uplink data in a Radio Resource Control (RRC) idle state or an RRC connect state.

In an implementation of the present embodiment, the first-type channel is a channel which is configured by the base station for the terminal and supports the terminal to send data at least one time.

In an implementation, the base station periodically configures resources occupied by a first channel. The first channel is used for the terminal to send data in the RRC idle state.

The resources occupied by the first channel involved in the present embodiment comprise at least one of the following: a time-domain resource, i.e. the first channel supporting Time Division Multiplexing (TDM), a frequency-domain resource, i.e. the first channel supporting Frequency Division Multiplexing (FDM), and a code subsequence used on time domain-frequency domain resource blocks, supporting Code Division Multiplexing (CDM).

It should be noted that the first-type channel is configured for each terminal independently. The first-type channel may be configured for each terminal by means of an RRC message.

In another alternative implementation of the present embodiment, when the first information indicates triggering the contention-based random access procedure and the first information element indicates the first content, the Msg4 or a third information element in the Msg4 sent by the base station indicates at least one of the following: the terminal enters the RRC connect state, and the terminal resides in the RRC idle state. When Msg4 is RRC Connection Setup, the terminal is instructed to enter the RRC connect state; and when Msg4 is RRC Connection Reject or RRC Connection Release or RRC Early Data Complete, the terminal is instructed to enter the RRC idle state.

In another alternative implementation of the present embodiment, in the case where the first information indicates triggering the contention-based random access procedure and the first information element indicates the second content, the Msg4 sent by the base station in the random access procedure comprises a fourth information element.

The fourth information element indicates at least one of the following: releasing the resources occupied by the first-type channel, the resources occupied by the first-type channel continue to be valid, and reconfiguration information about the resources occupied by the first-type channel.

In an implementation of the present embodiment, when the first information is information for triggering a random access procedure, the base station sending first information to a terminal over a downlink channel comprises: in the case where a first condition is satisfied, the base station sending the first information to the terminal on the downlink channel. The first condition is at least one of the following: a timer expires, and a first time-domain interval is smaller than or equal to a threshold. The first time-domain interval is a time-domain interval between a current moment and a start moment or an end moment of resources occupied by a next first-type channel. The timer is a timer for maintaining "the value of Timing Advanced (TA) to be a valid value". When the timer expires, it means that the value of the timing advanced has become an invalid value.

Embodiment 2

The present embodiment provides a method for sending information. The method comprises the following steps.

Step S202: a terminal initiates a random access procedure.

The random access procedure is triggered by at least one of the following: triggered by the terminal, and triggered by first information sent by a base station to the terminal. The random access procedure comprises at least one of the following: a contention-based random access procedure and a non-contention-based random access procedure.

It should be noted that the first information in the present embodiment may further comprise a first information element. The first information element indicates at least one of the following: first content, and second content.

The first content is at least one of the following: the Msg3 bears uplink data transmission in a random access process, EDT is supported in a random access process, information about a random access sequence or random access channel corresponding to the Msg3 bearing uplink data transmission, and information about a corresponding random access sequence or random access channel supporting EDT.

The second content is at least one of the following: the Msg3 does not bear uplink data transmission in a random access process, EDT is not supported in a random access process, information about a random access sequence or random access channel corresponding to the Msg3 not bearing uplink data transmission, and information about a corresponding random access sequence or random access channel not supporting EDT.

In an implementation, the random access procedure involved in the present embodiment may be a contention-based random access procedure.

In an alternative implementation of the present embodiment, in the case where the terminal initiates the contention-based random access procedure, the terminal receives a Msg4 sent by the base station.

The Msg4 comprises a second information element. The second information element indicates at least one of the following: releasing resources occupied by a first-type channel, and the resources occupied by the first-type channel continue to be valid. The first-type channel is a channel configured by the base station for the terminal to transmit uplink data in an RRC idle state or an RRC connect state.

It should be noted that in the foregoing implementation, the first information element indicates the first content.

In another implementation of the present embodiment, in the case where the second information element indicates releasing resources occupied by a first-type channel, the terminal executes the following operation: the terminal enters the RRC connect state.

In another implementation of the present embodiment, in the case where the second information element indicates that the resources occupied by the first-type channel continue to be valid, the terminal executes at least one of the following operations: the terminal enters the RRC idle state, and the terminal resides in the RRC idle state.

In still another implementation of the present embodiment, in the case where the first information indicates that the terminal initiates the contention-based random access procedure and the first information element indicates the first content, the terminal receives the Msg4 or a third information element in the Msg4 which is sent by the base station and indicates at least one of the following: the terminal enters the RRC connect state, and the terminal resides in the RRC idle state.

On this basis, in the case where the Msg4 or the third information element in the Msg4 indicates that the terminal enters the RRC connect state, the terminal releases first-type channel resources, i.e., the first-type channel is not used any longer to send uplink data.

In the case where the Msg4 or the third information element in the Msg4 indicates that the terminal resides in the RRC idle state, the terminal continues to use the first-type channel to send uplink data.

In still another implementation of the present embodiment, in the case where the first information indicates that the terminal initiates the contention-based random access procedure and the first information element indicates the second content, the terminal receives the Msg4 which is sent by the base station and comprises a fourth information element. The fourth information element indicates at least one of the following: releasing the resources occupied by the first-type channel, the resources occupied by the first-type channel continue to be valid, and reconfiguration information about the resources occupied by the first-type channel.

On this basis, in the case where the fourth information element indicates releasing the resources occupied by the first-type channel, the terminal enters the RRC connect state.

In the case where the fourth information element is used for indicating that the resources occupied by the first-type channel continue to be valid, the terminal executes the following operations: entering the RRC connect state; and entering the RRC idle state after entering the RRC connect state. In an implementation, the combination order of the two operations is the order described therein.

Entering the RRC idle state after entering the RRC connect state means that the terminal may enter the RRC idle state immediately after entering the RRC connect state, or enter the RRC idle state after performing some sending and receiving operations in the RRC connect state.

In the case where the fourth information element indicates reconfiguration information about the resources occupied by the first-type channel, the terminal executes the following operations: entering the RRC connect state; entering the RRC idle state after entering the RRC connect state; and in the RRC idle state, sending data on a first-type channel configured by the reconfiguration information about the resources occupied by the first-type channel. In an implementation, the combination order of the three operations is the order described therein.

In the case where the first information indicates that the terminal initiates the contention-based random access procedure and the first information element indicates the second content, the terminal executes at least one of the following operations: releasing resources occupied by the first-type channel, and entering the RRC connect state.

In the case where the first information indicates that the terminal initiates the contention-based random access procedure and the first information element indicates the second content, the terminal executes at least one of the following operations: entering the RRC connect state, entering the RRC idle state after entering the RRC connect state, and sending data on the first-type channel in the RRC idle state. In an implementation, the combination order of the three operations is the order described therein.

In another implementation of the present embodiment, the method of the present embodiment further comprises the following step.

Step S204: in the case where a first condition is satisfied, the terminal starts to detect the first information sent by the base station on the downlink channel.

The first condition is at least one of the following: a timer expires, and a first time-domain interval is smaller than or equal to a threshold. The first time-domain interval is a time-domain interval between a current moment and a start moment or an end moment of resources occupied by a next first-type channel.

Embodiment 3

The present embodiment provides a method for sending information. The method comprises the following steps.

Step S302: a base station sends second information over a downlink channel.

The second information indicates at least one of the following: data sent on a second-type channel needs to be retransmitted, triggering a contention-based random access procedure, and triggering a non-contention-based random access procedure.

The second-type channel is a channel which is configured by the base station and supports to send data at least one time. One second-type channel supports at least one terminal to send data. In an implementation, one second-type channel may support multiple terminals to send data simultaneously.

In addition, the resources occupied by the second-type channel comprise at least one of the following: a time-domain resource, i.e. the second-type channel supporting TDM, a frequency-domain resource, i.e. the second-type channel supporting FDM, and a code subsequence used on time domain-frequency domain resource blocks, supporting CDM.

It should be noted that the downlink channel involved in the present embodiment is at least one of the following: a downlink control channel and a downlink shared channel.

The downlink control channel is a downlink control channel corresponding to the second-type channel, and the downlink control channel is used for bearing physical layer control information. The downlink shared channel is a channel over which downlink data can be transmitted or a channel over which control information of a higher layer can be borne.

The downlink control channel is a downlink control channel configured for the second-type channel. Scheduling information about the downlink shared channel is indicated by means of the downlink control channel. In an implementation, the downlink shared channel also bears terminal identifier information. The terminal is a terminal from which the data sent on the second-type channel is successfully received by the base station.

In an implementation of the present embodiment, in the case where the second information is used for indicating that the data sent on the second-type channel needs to be retransmitted, a retransmission resource used for retransmission of the data sent on the second-type channel is a next second-type channel resource.

In another implementation of the present embodiment, the method may further comprise the following step.

Step S304: in the case where a second condition is satisfied, the base station sends the second information on the downlink channel to indicate at least one of the following: triggering a contention-based random access procedure, and triggering a non-contention-based random access procedure. The second condition is that the number of times of transmission failure of the data sent on the second-type channel reaches a threshold.

It should be noted that: (1) the definition of transmission failure of the data sent on the second-type channel is as follows: after the terminal sends data on the second-type channel, if no response message of "correct reception" sent from the base station is received, the terminal determines that the transmission of the data sent on the second-type channel at this time fails; (2) The value of the threshold is configured by the base station or configured by the system by default.

It should be noted that the number of times of transmission failure of the data sent on the second-type channel comprises at least one of the following: the number of times of consecutive transmission failure of the data sent on the second-type channel, and a sum of the number of times of transmission failure of the data sent on the second-type channel within a time window.

Embodiment 4

The present embodiment provides a method for sending information. The method comprises the following step.

Step S402: in the case a third condition is satisfied, a terminal initiates a contention-based random access procedure or initiates a non-contention-based random access procedure.

The third condition is that the number of times of transmission failure of the data sent on the second-type channel reaches a threshold.

It should be noted that the number of times of transmission failure of the data sent on the second-type channel comprises at least one of the following: the number of times of consecutive transmission failure of the data sent on the second-type channel, and a sum of the number of times of transmission failure of the data sent on the second-type channel within a time window.

The method of the present embodiment may further comprise: the terminal sending first uplink data to a base station on the second-type channel.

The terminal receives fourth information sent by the base station on the downlink channel, and when the fourth information does not comprise identifier information about the terminal, or the fourth information does not comprise indication information indicating that the first uplink data sent by the terminal is successfully received, or the fourth information sent by the base station is not detected by the terminal, the terminal sends second uplink data on a next second-type channel.

The second uplink data is at least one of the following: the first uplink data, uplink data different from the first uplink data, retransmission data of the first uplink data, and new uplink data.

The downlink channel is at least one of the following: a downlink control channel and a downlink shared channel.

The downlink control channel is a downlink control channel configured by the base station for the second-type channel, and scheduling information about the downlink shared channel is indicated by means of the downlink control channel.

Embodiment 5

The present embodiment provides a method for sending information. The method may comprise the following steps.

Step S502: a base station configures resources occupied by a second-type channel.

Step S504: the base station receives uplink data sent by a terminal on the second-type channel.

Step S506: the base station sends successful reception indication information over a downlink channel, wherein the successful reception indication information is used for indicating that the uplink data sent by the terminal is successfully received by the base station.

The uplink data sent on the second-type channel does not support Hybrid Automatic Repeat Request (HARQ) retransmission.

Embodiment 6

The present embodiment provides a method for receiving information. The method comprises the following steps.

Step S602: a terminal receives second information sent by a base station over a downlink channel.

The second information indicates at least one of the following: data sent on a second-type channel needs to be retransmitted, triggering a contention-based random access procedure, and triggering a non-contention-based random access procedure.

It should be noted that the downlink channel involved in the present embodiment is at least one of the following: a downlink control channel and a downlink shared channel.

The downlink control channel is a downlink control channel configured by the base station for the second-type channel, and scheduling information about the downlink shared channel is indicated by means of the downlink control channel.

In an implementation, the downlink shared channel also bears terminal identifier information. The terminal corresponding to a terminal identifier is a terminal from which the data sent on the second-type channel is successfully received by the base station.

Based on the above description, in the case where the second information is used for indicating that the data sent on the second-type channel needs to be retransmitted, a resource used by the terminal for retransmission of the data sent on the second-type channel is a next second-type channel resource.

In the case where the data sent by the terminal on the second-type channel is not successfully detected by the base station, the terminal executes subsequent operations according to the received second information.

It should be noted that the case where the data sent by the terminal on the second-type channel is not successfully detected by the base station comprises: the identifier information about the terminal is not detected in the information sent by the base station, and the base station may send the identifier information about the terminal by means of the downlink control channel or the downlink shared channel indicated by the downlink control channel.

On this basis, the terminal needs to execute, according to the received second information, subsequent operations comprising the following content.

When the second information indicates "data sent on a second-type channel needs to be retransmitted", the terminal retransmits the data sent on the second-type channel.

When the second information indicates "triggering a contention-based random access procedure", the terminal triggers a contention-based random access procedure.

When the second information indicates "triggering a non-contention-based random access procedure", the terminal triggers a non-contention-based random access procedure.

It should be noted that the case where the data sent by the terminal on the second-type channel is not successfully detected by the base station comprises: the identifier information about the terminal is not detected in the information sent by the base station. The base station may send the identifier information about the terminal by means of the downlink control channel or the downlink shared channel indicated by the downlink control channel.

The terminal needs to execute, according to the received second information, subsequent operations comprising: (1) in the case where the second information is used for indicating that the data sent on the second-type channel needs to be retransmitted, the terminal retransmits the data sent on the second-type channel. (2) In the case where the second information is used for indicating triggering a contention-based random access procedure, the terminal triggers a contention-based random access procedure. In the case where the second information is used for indicating triggering a non-contention-based random access procedure, the terminal triggers a non-contention-based random access procedure.

In another implementation of the present embodiment, the method of the present embodiment further comprises the following step.

Step S604: in the case where a second condition is satisfied, the terminal receives second information sent by the base station on the downlink channel.

The second information indicates at least one of the following: triggering a contention-based random access procedure and triggering a non-contention-based random access procedure.

The second condition is that the number of times of transmission failure of the data sent on the second-type channel reaches a threshold.

It should be noted that (1) the definition of transmission failure of the data sent on the second-type channel is as follows: after the terminal sends data on the second-type channel, if no response message of "correct reception" sent from the base station is received, the terminal determines that the transmission of the data sent on the second-type channel at this time fails. (2) The value of the threshold is configured by the base station or configured by the system by default.

Embodiment 7

The present embodiment provides an information detection method. The method comprises the following step.

Step S702: in the case where a terminal does not transmit data on a fifth-type channel, the terminal detects a downlink control channel corresponding to the fifth-type channel.

The downlink control channel corresponding to the fifth-type channel bears downlink control information. The downlink control information comprises at least one of the following: indication information indicating that uplink data sent by the terminal on the fifth-type channel is correctly received, indication information indicating that uplink data sent by the terminal on the fifth-type channel is not correctly received, and retransmission scheduling information about the uplink data sent by the terminal on the fifth-type channel.

It should be noted that the fifth-type channel is a channel which is configured by the base station for the terminal and supports the terminal to send data at least one time.

In an implementation of the present embodiment, the base station periodically configures resources occupied by the fifth channel. In an implementation, the fifth channel may be used for the terminal to send data in an RRC idle state.

In an implementation, the resources occupied by the fifth channel comprise at least one of the following: a time-domain resources, i.e. the fifth channel supporting TDM, a frequency-domain resource, i.e. the fifth channel supporting FDM, and a code subsequence used on time domain-frequency domain resource blocks, supporting CDM.

In an implementation, the fifth-type channel is configured for each terminal independently. Each terminal may be configured by means of an RRC message.

In an implementation of the present embodiment, the method of the present embodiment may further comprise the following step.

When the terminal detects downlink control information sent by the base station to the terminal itself, the terminal sends third information to the base station on a sixth-type channel.

The third information indicates at least one of the following: the terminal does not send data on the fifth-type channel, and there is no need to configure retransmission resources for the data sent on the fifth-type channel.

In an implementation of the present embodiment, resources occupied by the sixth-type channel are determined by at least one of the following: configured in the downlink control information sent by the base station to the terminal, and resources used for retransmission of the uplink data sent on the fifth-type channel and configured in the downlink control information sent by the base station to the terminal.

In an implementation of the present embodiment, the method of the present embodiment may further comprise the following step.

When the terminal detects the downlink control information sent by the base station to the terminal itself, the downlink control information sent by the base station to the terminal indicates at least one of the following: indication information indicating that the uplink data sent by the terminal on the fifth-type channel is not correctly received, and retransmission scheduling information about the uplink data sent by the terminal on the fifth-type channel.

It should be noted that the third information involved in the present embodiment is at least one of the following: a data sending format of a predefined structure and a sequence of a predefined structure.

A data sending format of a predefined structure means that a data sending format corresponding to the third information is configured by default in standards or sent to the terminal by the base station by means of signaling. When the terminal needs to send the third information, the third information is sent by using such a predefined structure. A sequence of a predefined structure means that the third information is a sequence or multiple repetitions of a sequence or a group of sequences arranged according to a predefined structure.

In an implementation, the sixth channel resources used for sending the third information are resource used for retransmission of the uplink data sent on the fifth-type channel and configured in the downlink control information sent by the base station to the terminal.

Embodiment 8

The present embodiment provides a method for sending information. The method comprises the following step.

Step S802: after third information sent by the terminal is detected on a sixth channel, a base station executes the following operation: not configuring retransmission resources for the uplink data sent by the terminal on the fifth-type channel any longer.

Embodiment 9

The present embodiment provides a method for sending information. The method comprises the following step.

Step S902: before a terminal sends uplink data on a third-type channel, the terminal sends a first signal on a fourth-type channel.

Resources occupied by the fourth-type channel and resources occupied by the third-type channel correspond to a time-domain interval therebetween, and the time-domain interval has a length greater than or equal to 0; or resources occupied by the fourth-type channel are located in resources occupied by the third-type channel.

It should be noted that the function of the first signal is to notify a base station, such as an evolved NodeB (eNB), that the terminal has uplink data which needs to be sent on the third-type channel. After the first signal is detected, the base station may detect, on the third-type channel resources, the uplink data sent by the terminal.

FIG. 2 is a schematic diagram I of resources occupied by a first signal according to an embodiment of the present disclosure. As shown in FIG. 2, the resources occupied by the first signal are resources occupied by the fourth-type channel. The resources occupied by the terminal to send the data are the resources numbered as "1" in FIG. 2. Before sending data on the resources numbered as "1", the terminal sends a first signal on the resources occupied by the first signal. After the first signal is detected, the base station may detect, on the resources numbered as "1", the uplink data sent by the terminal.

Figure 3:
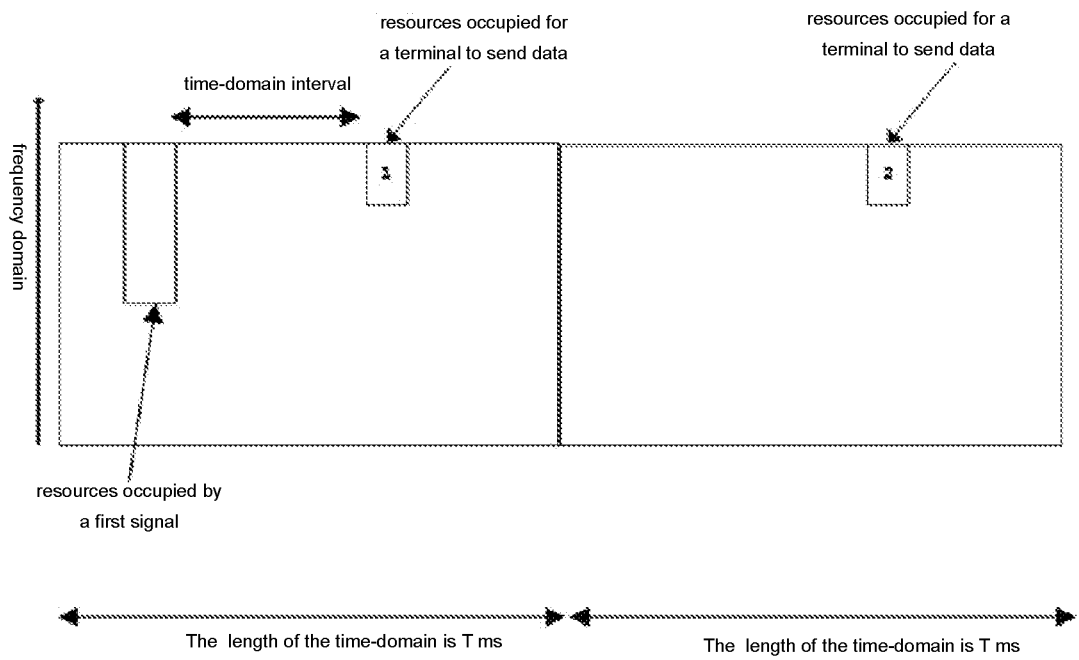
FIG. 3 is a schematic diagram II of resources occupied by a first signal according to an embodiment of the present disclosure.

FIG. 3 is a schematic diagram II of resources occupied by a first signal according to an embodiment of the present disclosure. As shown in FIG. 3, the resources occupied by the first signal are resources occupied by the fourth-type channel. The resources occupied by the terminal to send the data are the resources numbered as "1" and "2" in FIG. 3, and a resource configuration period is T milliseconds (ms). Before sending data on the resources numbered as "1" and "2", the terminal sends a first signal on the resources occupied by the first signal. After the first signal is detected, the base station may detect, on the resources numbered as "1" and "2", the uplink data sent by the terminal.

Figure 4:
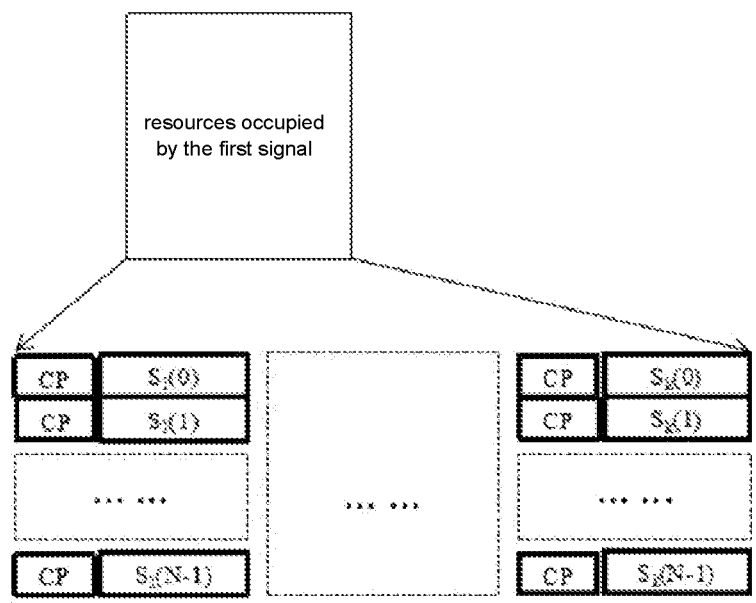
FIG. 4 is a schematic structural diagram I of a first signal according to an embodiment of the present disclosure.

FIG. 4 is a schematic structural diagram I of a first signal according to an embodiment of the present disclosure. FIG. 4 shows a structure of the first signal in FIGS. 2 and 3. Resources occupied by the first signal comprise K symbols (symbol 1, symbol 2, . . . , and symbol K, and a Cyclic Prefix (CP) is configured for each symbol) in a time domain, and comprise N subcarriers in a frequency domain. A sequence $S_1$ with length N of the first signal is sent over N sub-carriers of the symbol 1, a sequence $S_2$ with length N is sent over N sub-carriers of the symbol 2, and so on, and a sequence $S_k$ with length N is sent over N subcarriers of the symbol K.

It should be noted that sequences $S_1, S_2, \ldots,$ and $S_k$ may be the same or different, or may be configured by the base station. When the resources occupied by the first signals support the transmission of the first signals of multiple terminals, sequences $S_1, S_2, \ldots,$ and $S_k$ corresponding to different terminals are different or are respectively configured by the base station.

Figure 5:
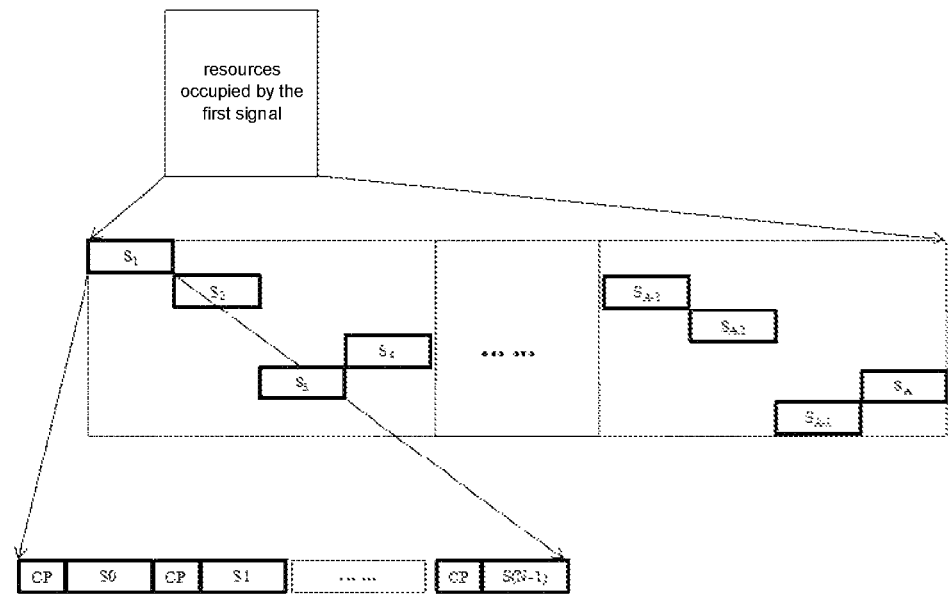
FIG. 5 is a schematic structural diagram II of a first signal according to an embodiment of the present disclosure.

FIG. 5 is a schematic structural diagram II of a first signal according to an embodiment of the present disclosure. FIG. 5 shows another structure corresponding to the first signal in FIGS. 2 and 3. Resources occupied by the first signal comprise at least one symbol in a time domain, a Cyclic Prefix (CP) being configured for each symbol, and comprises at least one subcarrier in a frequency domain. A first signal corresponding to a terminal is composed of A (A is an integer greater than or equal to 1) sequences, which are $S_1$, $S_2, \ldots,$ and $S_A$, respectively. The length of one sequence is N, and one sequence occupies N symbols in the time domain and occupies one subcarrier in the frequency domain. The value of the length N corresponding to each sequence may be the same or different or may be configured by the base station. The subcarriers of the A sequences in the frequency domain may be the same or different or may be configured by the base station.

The sequences $S_1, S_2, \ldots,$ and $S_A$ may be the same or different or may be configured by the base station.

When the resources occupied by the first signal support the transmission of the first signals of multiple terminals, at least one of the following is included: sequences $S_1$, $S_2, \ldots,$ and $S_k$ corresponding to different terminals are different or are configured by the base station respectively, and resources occupied when sending sequences $S_1$, $S_2, \ldots,$ and $S_k$ corresponding to different terminals are different or are configured by the base station respectively.

It should be noted that the definitions of the third-type channel involved in the present embodiment comprise the following two definitions.

Definition 1:

The third-type channel is a channel which is configured by the base station for the terminal and supports the terminal to send data at least one time. In an implementation, the base station periodically configures resources occupied by the third channel. The third channel is used for the terminal to send data in the RRC idle state.

Definition 2:

The third-type channel is a channel which is configured by the base station and supports to send data at least one time. One third-type channel supports at least one terminal to send data. One third-type channel may support multiple terminals to send data simultaneously.

With regard to definitions 1 and 2, the resources occupied by the third channel herein comprise at least one of the following: a time-domain resources, i.e. the third channel supporting TDM, a frequency-domain resource, i.e. the third channel supporting FDM, and a code subsequence used on time domain-frequency domain resource blocks, supporting CDM.

At least one of the following is configured by the base station: the resources occupied by the fourth-type channel of the terminal and the sequence corresponding to the first signal, or at least one of the following is selected from a set of the first signal: the resources occupied by the fourth-type channel and the sequence corresponding to the first signal of the terminal.

The set of the first signal comprises at least one of the following: a first resource set and a first sequence set. The first resource set comprises resources occupied by at least one fourth-type channel. The first sequence set comprises a sequence corresponding to at least one first signal. In an implementation, the set of the first signal is configured by the base station and the first signal is generated according to the sequence.

It should be noted that the sets of the first signals to which the first signals corresponding to the terminal satisfying a first condition belong are the same. The first condition comprises at least one of the following: the resources occupied by third-type channel of the terminal are within same time window, resources occupied by start resources or end resources of the third-type channel of the terminal are within same time window, and frequency-domain resources occupied by the third-type channel of the terminal are within one frequency-domain bandwidth.

A time-domain position of the first resource set in the set of the first signal is also within the time window.

In an implementation, the first signal is a random access signal and the fourth-type channel is a random access channel.

In addition, a set of one first signal corresponds to one coverage enhancement level, or a set of one first signal corresponds to the number of times of repeated transmissions of one third-type channel. The terminal selects a corresponding set of the first signal according to a coverage enhancement level of the terminal or the number of times of repeated transmissions of the third-type channel.

Based on the above description, at least one of the following is configured by the base station: index information about resources occupied by the fourth-type channel of the terminal in the first resource set is configured by the base station, and index information about the sequence corresponding to the first signal of the terminal in the first sequence set.

It should be noted that a set of the at least one first signal corresponds to a resource set occupied by one third-type channel. The resource set occupied by the third-type channel is allocated to one terminal or multiple terminals.

On this basis, the terminal determines the corresponding set of the first signal according to a resource set to which the selected resources occupied by the third-type channel belong. In the case where the terminal determines the corresponding sets of multiple first signals according to the resource set to which the selected resources occupied by the third-type channel belong, the terminal randomly selects a set of one first signal.

In an implementation, the terminal selects the corresponding resource set occupied by the third-type channel according to its coverage enhancement level.

In an implementation, when the resource set occupied by the third-type channel comprises resources occupied by multiple third-type channels, the terminal sends data on the resources occupied by multiple third-type channels.

In an implementation, when the resource set occupied by the third-type channel comprises resources occupied by multiple third-type channels, the terminal randomly selects the resources occupied by its own third-type channel.

In an implementation, when the terminal selects a set of the first signal, and the corresponding set of the first signal comprises at least one of the following: resources occupied by multiple fourth-type channels and sequences corresponding to multiple first signals, the terminal randomly selects at least one of the following: resources occupied by its own fourth-type channel and a sequence corresponding to its own first signal.

In an alternative implementation of the present embodiment, the terminal selects, according to the selected set of the first signal, the resources occupied by the third-type channel from the corresponding resource set occupied by the third-type channel. In an implementation, when the resource set occupied by the third-type channel comprises resources occupied by multiple third-type channels, the terminal randomly selects the resources occupied by its own third-type channel.

The above Embodiments 1 to 7 are illustrated below by way of examples with reference to the implementations of the present embodiment.

Example 1

In an NB-IoT system, a contention-based random access procedure at least comprises the following steps.

A terminal in NB-IoT sends a random access signal on a Narrow Band Physical Random Access Channel (NPRACH) of the NB-IoT system, and the random access signal is also referred to as Msg1.

After receiving the Msg1, a base station sends a Random Access Response (RAR, also referred to as Msg2) to the terminal.

The terminal receives the Msg2, and obtains uplink time synchronization and uplink resources. However, at this time, it cannot be determined that the Msg2 is sent to the terminal itself rather than to other UEs because there is a possibility that different terminals send the same random access sequence on the same time-frequency resources, and therefore, it is necessary to solve a random access conflict by means of following Msg3 and Msg4. The Msg3 is sent by the terminal to the base station, and the Msg4 is a response message sent by the base station to the terminal in response to the received Msg3.

Figure 6:
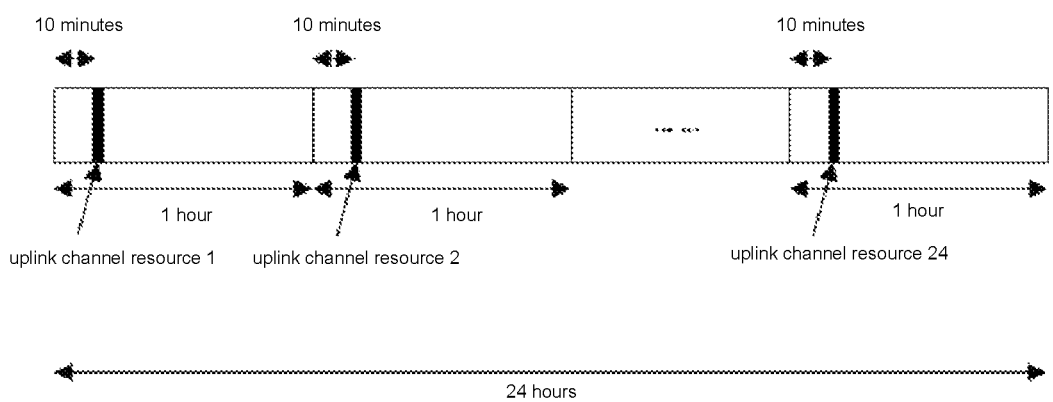
FIG. 6 is a schematic diagram of uplink channel resources configured by a base station for a terminal according to an embodiment of the present disclosure.

In the present example, FIG. 6 is a schematic diagram of uplink channel resources configured by a base station for a terminal according to an embodiment the present disclosure. As shown in FIG. 6, it is used for supporting the terminal to send uplink data in an RRC idle state. The uplink channel resources are configured periodically, the period is 1 hour, and the offset of the starting position of each uplink channel resource is 10 minutes.

In the present example, when a first condition is satisfied, the base station in the NB-IoT system sends a PDCCH order to the terminal on a downlink control channel. The first condition is at least one of the following: a timer for "maintaining the value of Timing Advanced (TA) to be a valid value" expires, and a time-domain interval is less than or equal to a threshold. The time-domain interval is a time-domain interval between a current moment and a start moment or an end moment of resources occupied by a next uplink channel.

The PDCCH order is a sending format of DCI to trigger a random access procedure. The PDCCH order comprises index information about a random access channel. In the present alternative example, when the index information about the random access channel is 0, the terminal is instructed to initiate a contention-based random access procedure.

In the present alternative example, the PDCCH order further comprises a first information element. The first information element indicates "EDT is supported in a random access process".

The EDT is at least one of the following: the Msg3 bears data in a random access process, and the Msg3 and the Msg4 both bear data in a random access process.

When the first information element is 1-bit information, for example, when the first information element is "1", it means that "EDT is supported in a random access process"; and when the first information element is "0", it means that "EDT is not supported in a random access process".

In the present example, the terminal initiates a contention-based random access procedure according to the PDCCH order sent by the base station. In the contention-based random access procedure, the base station includes a second information element in the Msg4.

The second information element indicates at least one of the following: releasing the uplink channel resources, and the uplink channel resources continue to be valid.

When the second information element indicates "releasing the uplink channel resources", the terminal executes the following operation: the terminal enters an RRC connect state.

When the second information element indicates "the uplink channel resources continue to be valid", the terminal executes at least one of the following operations: the terminal enters an RRC idle state, the terminal resides in the RRC idle state, and the terminal continues to use the uplink channel resources to send data.

Example 2

Figure 7:
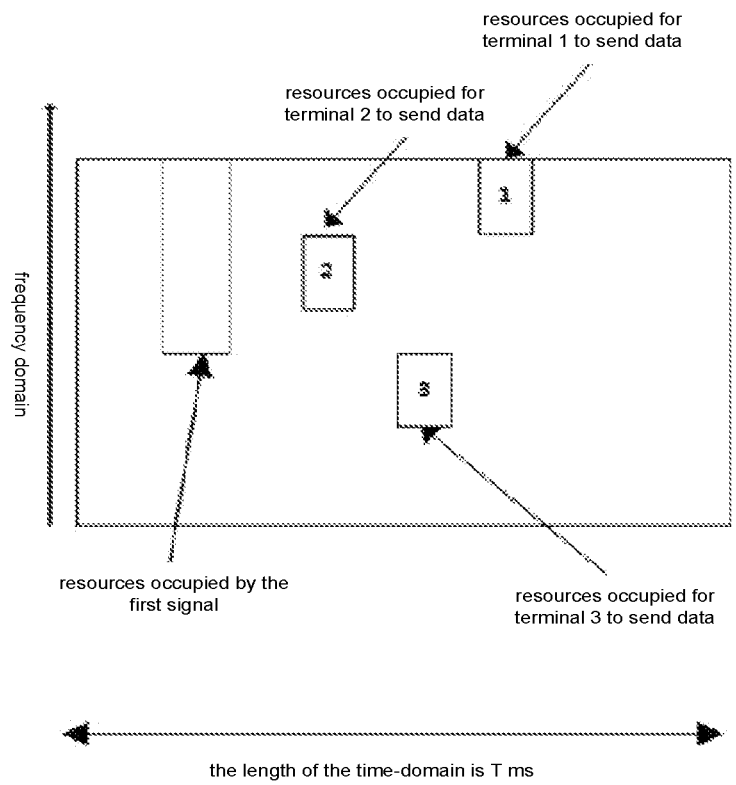
FIG. 7 is a schematic diagram I of a resource set configured by a base station and occupied when sending a first signal according to an embodiment of the present disclosure.

FIG. 7 is a schematic diagram I of a resource set configured by a base station and occupied when sending a first signal according to an embodiment of the present disclosure. On this basis, in the present example, a base station configures uplink channel resources for a terminal to support the terminal to send uplink data in an RRC idle state. The uplink channel resources are configured periodically. In the present example, the base station configures uplink channel resources for three terminals (terminal 1, terminal 2 and terminal 3 respectively).

In the present example, the base station configures resources occupied by a first signal, the first signal is sent by a terminal to the base station, and the function of the first signal is to notify the base station that the terminal has uplink data which needs to be sent on the uplink channel. After the first signal is detected, the base station may detect, on the uplink channel, the uplink data sent by the terminal.

In the present example, within a time period with a time-domain length of T ms, the base station configures a resource set occupied when sending the first signal, as shown in FIG. 7. An uplink channel resource of the terminal 1, an uplink channel resource of the terminal 2 and an uplink channel resource of the terminal 3 are within the time period of T ms.

The base station configures at least three orthogonal time-frequency domain resources in the resource set occupied by the first signal. The base station configures an orthogonal time-frequency domain resource for the terminal 1, the terminal 2 and the terminal 3 respectively. When a terminal is to send data on the uplink channel within a time period of T ms, the terminal firstly sends a first signal on the orthogonal time-frequency domain resource configured by the base station for the terminal.

The base station firstly detects whether a first signal is sent in a resource set occupied by the first signal, and after the first signal is detected on an orthogonal time-frequency domain resource, the base station detects uplink data sent by the terminal on an uplink channel resource corresponding to the orthogonal time-frequency domain resource.

Example 3

In the present example, a base station configures uplink channel resources for a terminal to support the terminal to send uplink data in an RRC idle state. The uplink channel resources are configured periodically. In the present example, the base station configures uplink channel resources for three terminals (terminal 1, terminal 2 and terminal 3 respectively).

In the present example, the base station configures resources occupied by a first signal, the first signal is sent by a terminal to the base station, and the function of the first signal is to notify the base station that the terminal has uplink data which needs to be sent on the uplink channel. After the first signal is detected, the base station may detect, on the uplink channel, the uplink data sent by the terminal.

In the present example, within a time period with a time-domain length of T ms, the base station configures a resource set occupied when sending the first signal, as shown in FIG. 7. In addition, the base station configures a sequence set corresponding to the first signal, comprising sequences corresponding to at least three first signals. An uplink channel resource of the terminal 1, an uplink channel resource of the terminal 2 and an uplink channel resource of the terminal 3 are within the time period of T ms.

The base station indicates, by means of signaling, indexes of the sequences corresponding to the first signals of three terminals in the sequence set respectively. When a terminal is to send data on the uplink channel within a time period of T ms, the terminal firstly generates the first signal according to the sequence allocated therefor by the base station, and sends a first signal on the resource set occupied when sending the first signal.

The base station firstly detects whether a first signal is sent in a resource set occupied by the first signal, and after the first signal is detected, the base station further detects, according to a sequence index corresponding to the detected first signal, uplink data sent by the terminal on an uplink channel resource corresponding to the sequence index.

Example 4

Figure 8:
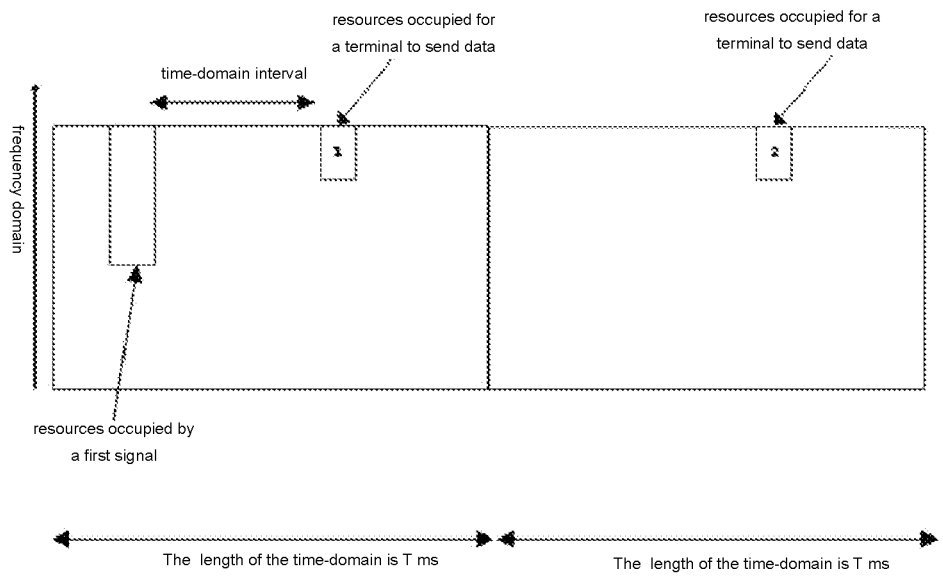
FIG. 8 is a schematic diagram II of a resource set configured by a base station and occupied when sending a first signal according to an embodiment of the present disclosure.

FIG. 8 is a schematic diagram II of a resource set configured by a base station and occupied when sending a first signal according to an embodiment of the present disclosure. On this basis, in the present example, a base station configures uplink channel resources for a terminal to support the terminal to send uplink data in an RRC idle state. The uplink channel resources are configured periodically with a period of T ms. In the present example, the base station configures uplink channel resources for one terminal, as shown in FIG. 8.

In the present alternative example, within a time period with a time-domain length of 2 T ms, the base station configures a resource set occupied when sending the first signal, as shown in FIG. 8. The two uplink channel resources of the terminal are within the time period of 2 T ms.

When a terminal is to send data on the uplink channel (at least one of a first uplink channel and a second uplink channel) within a time period of 2 T ms, the terminal firstly sends a first signal on a resource configured therefor by the base station and occupied when sending the first signal.

The base station firstly detects whether a first signal is sent in a resource set occupied by the first signal, and after the first signal is detected, the base station detects uplink data sent by the terminal on the uplink channel within a time period of 2 T ms.

Example 5

Figure 9:
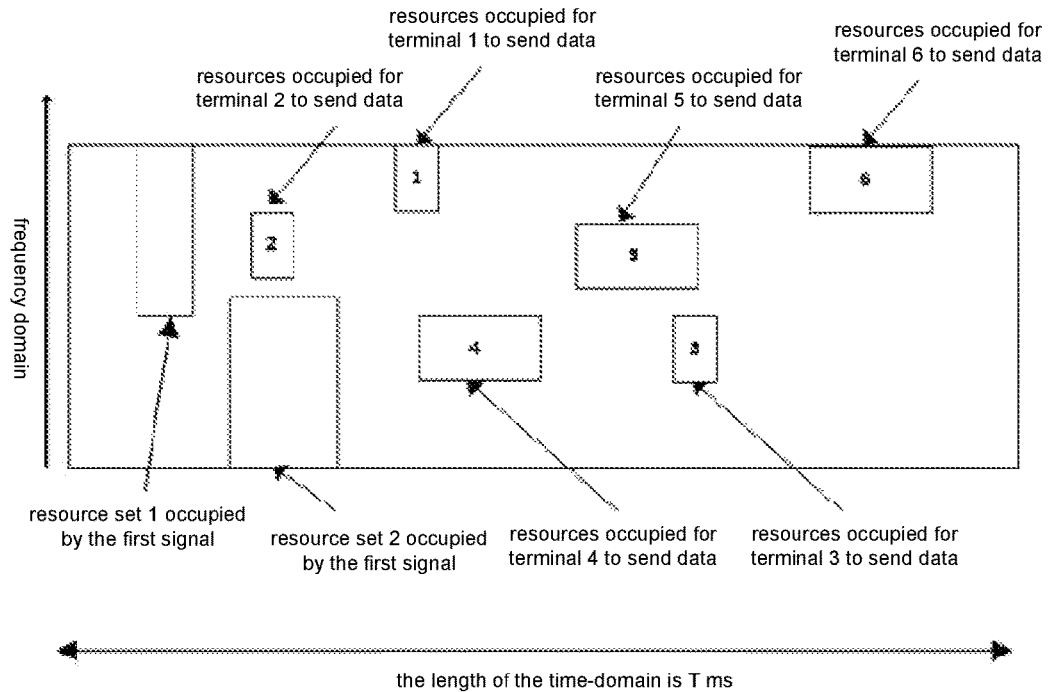
FIG. 9 is a schematic diagram of resource sets configured by a base station and occupied when sending two first signals according to an embodiment of the present disclosure.

FIG. 9 is a schematic diagram of a resource set configured by a base station and occupied when sending two first signals according to an embodiment of the present disclosure. On this basis, in the present example, a base station configures uplink channel resources for a terminal to support the terminal to send uplink data in an RRC idle state. The uplink channel resources are configured periodically. In the present example, the base station configures uplink channel resources for six terminals (terminal 1, terminal 2, terminal 3, terminal 4, terminal 5 and terminal 6 respectively). The resources used by the terminal 1, the terminal 2 and the terminal 3 correspond to coverage enhancement level 0, and the resources used by the terminal 4, the terminal 5 and the terminal 6 correspond to coverage enhancement level 1.

In the present example, within a time period with a time-domain length of T ms, the base station configures resource sets occupied when sending the first signals, as shown in FIG. 9. The base station configures two resource sets occupied when sending the first signals, which are respectively a resource set 1 occupied by the first signals and a resource set 2 occupied by the first signals. The resource set 1 occupied by the first signals corresponds to coverage enhancement level 0, and the resource set 2 occupied by the first signals corresponds to coverage enhancement level. The terminal 1 to the terminal 6 each have an uplink channel resource within the time period of T ms.

In the present example, as the resources used by the terminal 1, the terminal 2 and the terminal 3 correspond to coverage enhancement level 0, the terminal 1, the terminal 2 and the terminal 3 use a first signal resource set corresponding to coverage enhancement level 0, i.e. the resource set 1; and as the resources used by the terminal 4, the terminal 5 and the terminal 6 correspond to coverage enhancement level 1, the terminal 4, the terminal 5 and the terminal 6 use a first signal resource set corresponding to coverage enhancement level 1, i.e. the resource set 2.

The resource set 1 comprises sequences corresponding to at least three first signals, and the base station indicates, by means of signaling, indexes of the sequences corresponding to the first signals of terminals 1-3 in the sequence set respectively.

The resource set 2 comprises sequences corresponding to at least three first signals, and the base station indicates, by means of signaling, indexes of the sequences corresponding to the first signals of terminals 4-6 in the sequence set respectively.

Through the above description of the examples, those skilled in the art can clearly understand that the method according to the above embodiments may be implemented by means of software with necessary universal hardware platform, and of course, may also be implemented by hardware. However, in many cases, the former is a preferred example. Based on such understanding, the technical solutions of the present disclosure essentially or the part contributing to the related art may be embodied in the form of a software product. The computer software product is stored in a storage medium such as a Read-Only Memory (ROM)/Random Access Memory (RAM), a magnetic disk and an optical disk, and comprises several instructions for causing a terminal device, which may be a mobile phone, a computer, a server, or a network device, to implement the methods described in the embodiments of the present disclosure.

Example 6

In a wireless communication system in the present example, a base station sends uplink channel configuration information. The uplink channel configuration information comprises at least one of the following: resource configuration information occupied by an uplink channel and configuration information about a downlink control channel search space.

Information borne on a downlink control channel comprises downlink control information (DCI). In addition, the uplink channel is used for data transmission of UE in a Radio Resource Control IDLE (RRC-IDLE) state or a Radio Resource Control CONNECT (RRC-CONNECT) state.

Figure 10:
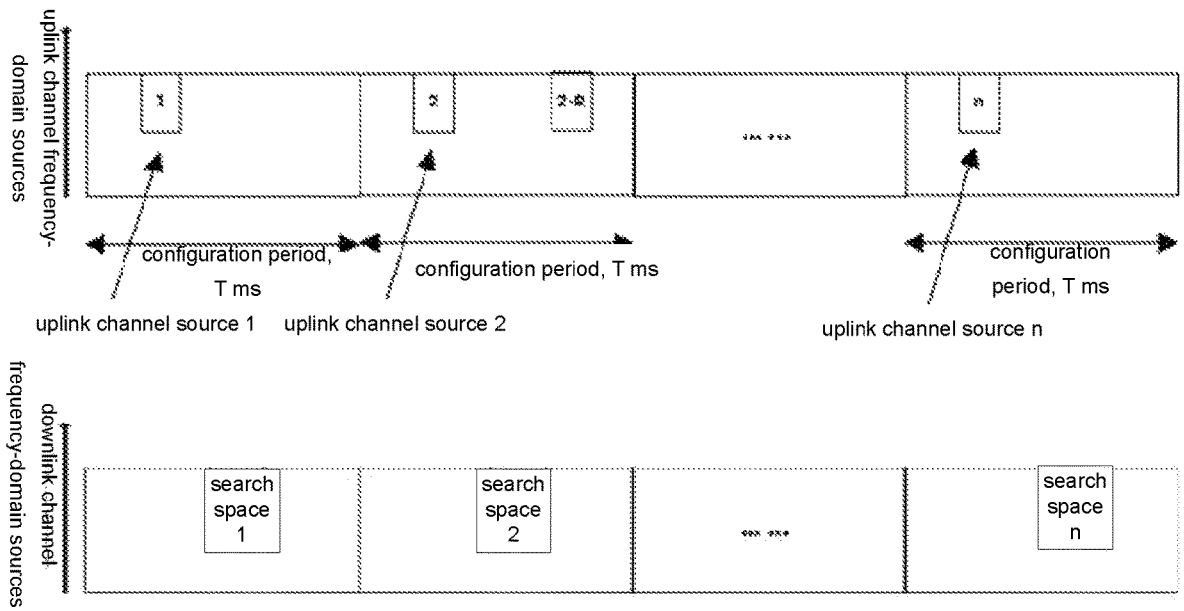
FIG. 10 is schematic diagram of distribution of n uplink channel resources according to an embodiment of the present disclosure.

The resource configuration information occupied by the uplink channel indicates at least one uplink channel resource. In the present example, the uplink channel resources are configured periodically with a period length of T ms. FIG. 10 is schematic diagram of distribution of n uplink channel resources according to an embodiment of the present disclosure. FIG. 10 shows the uplink channel resource numbered as 1 to uplink channel resource numbered as n.

The configuration information about a downlink control channel search space indicates at least one downlink control channel search space, and one downlink control channel search space corresponds to one uplink channel resource. As shown in FIG. 10, a downlink control channel search space corresponding to uplink channel resource 1 is search space 1, a downlink control channel search space corresponding to uplink channel resource 2 is search space 2, and so on, a downlink control channel search space corresponding to uplink channel resource n is search space n.

In the present example, when a terminal has no data which needs to be sent on the uplink channel resource 2, the terminal does not send any information on the uplink channel resource 2. However, the terminal may detect downlink control information in the search space 2. When the terminal detects downlink control information sent by the base station to the terminal itself, the terminal sends third information to the base station on retransmission resources (in the present example, resources 2-R are the retransmission resources of data transmitted on the uplink channel resource 2 indicated in the downlink control information) of data transmitted on the uplink channel resource 2 indicated in the detected downlink control information.

The third information indicates at least one of the following: the terminal does not send data on the uplink channel resource 2, and there is no need to configure retransmission resources for the data transmitted on the uplink channel resource 2.

After the third information sent by the terminal is detected on the resources 2-R, the base station executes the following operation: not configuring retransmission resources for the data transmitted by the terminal on the uplink channel resource 2 any longer.

Example 7

A base station configures resources occupied by a second-type channel, wherein the resources occupied by the second-type channel support at least one of the following: TDM, FDM and CDM. The number of the resources of the second-type channel is at least 1. The base station allocates resources occupied by at least one group of the second-type channels at one time. The resources occupied by one group of the second-type channels may support one terminal or a group of terminals to send uplink data simultaneously.

After the terminal sends uplink data on the resources occupied by one group of the second-type channels, the base station receives the uplink data sent by the terminal. After the base station successfully receives the uplink data sent by the terminal, the base station sends successful reception indication information over a downlink channel, wherein the successful reception indication information is used for indicating that the uplink data sent by the terminal is successfully received by the base station.

If the base station does not successfully receive the uplink data sent by the terminal, the base station does not send the successful reception indication information on the downlink channel. Meanwhile, the base station does not support HARQ retransmission.

If it is detected that no successful reception indication information is sent on the downlink channel, the terminal may send uplink data on a next group of the second-type channels.

The uplink data is at least one of the following: previously sent uplink data, uplink data different from the previously sent uplink data, retransmission data of the previously sent uplink data and new uplink data.

The base station may receive, according to the new data, uplink data sent by the terminal on the next group of the second-type channels.

An embodiment of the present disclosure further provide information sending and receiving devices used for implementing the above embodiments and examples. What has been described will not be described repeatedly herein. As used in the following Embodiment 10, the term "module" refers to a combination of at least one of software and hardware capable of implementing preset functions.

Although the devices described in the following embodiments are preferably implemented by software, example by hardware or a combination of software and hardware is also possible and conceivable.

Embodiment 10

Figure 11:
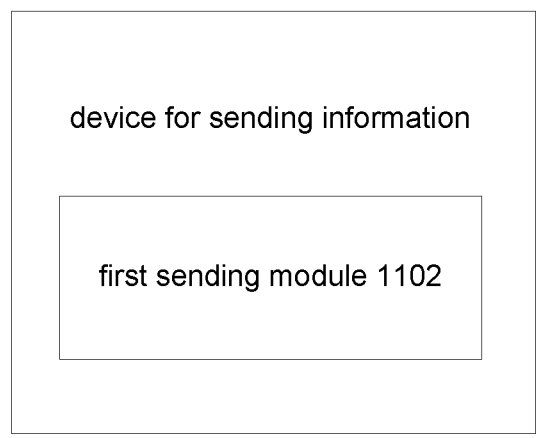
FIG. 11 is a schematic structural diagram of a device for sending information according to an embodiment of the present disclosure.

The present embodiment is a device embodiment corresponding to Embodiment 1. FIG. 11 is a schematic structural diagram of a device for sending information according to an embodiment of the present disclosure. The device is applied to a base station side. As shown in FIG. 11, the device comprises a first sending module 1102. The first sending module 1102 is configured to send first information to a terminal over a downlink channel. The first information comprises one of the following: information for triggering a random access procedure, and a Msg4 in a random access process.

Embodiment 11

The present embodiment provides a device for sending information. The device comprises a second sending module. The second sending module is configured to send second information over a downlink channel. The second information indicates one of the following: data sent on a second-type channel needs to be retransmitted, triggering a contention-based random access procedure, and triggering a non-contention-based random access procedure.

Embodiment 12

The present embodiment is a device embodiment corresponding to Embodiment 3. The present embodiment provides a device for receiving information. The device is applied to a terminal side. The device comprises an initiation module. The initiation module is configured to initiate a contention-based random access procedure or a non-contention-based random access procedure. The contention-based random access procedure or non-contention-based random access procedure is triggered by at least one of the following: triggered by the terminal, and triggered by first information sent by a base station to the terminal.

Embodiment 13

The present embodiment provides a device for receiving information. The device comprises a receiving module. The receiving module is configured to receive second information sent by a base station over a downlink channel. The second information indicates at least one of the following: data sent on a second-type channel needs to be retransmitted, triggering a contention-based random access procedure, and triggering a non-contention-based random access procedure.

Embodiment 14

The present embodiment provides a device for receiving information. The device is applied to a terminal side. The device comprises a third sending module. The third sending module is configured to, before a terminal sends uplink data on a third-type channel, send a first signal on a fourth-type channel. The first signal is used for notifying a base station that the uplink data will be sent on the third-type channel, resources occupied by the third-type channel and resources occupied by the fourth-type channel correspond to a time-domain interval therebetween, and the time-domain interval has a length greater than or equal to 0. It should be noted that all the above modules may be implemented by software or hardware. The latter may be implemented in the following manners, but not limited thereto: all the above modules are located in the same processor; or the above modules are located in different processors in arbitrary combinations.

An embodiment of the present disclosure further provide a storage medium. The storage medium stores a computer program, and the computer program, when running, is configured to execute the steps in any one of the above method embodiments.

In the present embodiment, the storage medium may be configured to store a computer program for executing the following step:

S1: sending first information to a terminal over a downlink channel.

In the present embodiment, the storage medium may comprise, but not limited to, a plurality of media capable of storing a computer program, such as a USB flash disk, a ROM, a RAM, a mobile hard disk, a magnetic disk, or an optical disk.

Obviously, those skilled in the art should understand that modules or steps in the present disclosure may be implemented by universal computing devices which may be integrated on a single computing device or distributed on a network composed of multiple computing devices. In an embodiment, they can be implemented by executable program codes of a computing device, and in this way, they can be stored in a storage device and executed by the computing device. Furthermore, in some cases, the shown or described steps may be executed in an order different from that described herein, or they may be made into multiple integrated circuit modules, or multiple modules or steps therein are made into a single integrated circuit module for implementation. Thus, the present disclosure is not limited to any particular combination of hardware and software.

The foregoing descriptions are merely preferred embodiments of the present disclosure, and are not intended to limit the present disclosure. For those skilled in the art, the present disclosure may have various modifications and variations. Any modifications, equivalent replacements, improvements, etc. made in line with the principle of the present disclosure shall be included in the scope of protection of the present disclosure.

What is claimed is:

1. A method for sending information, comprising:
sending, by a base station, first information to a terminal over a downlink channel;
wherein the first information comprises one of the following: information for triggering a random access procedure, and Message 4 (Msg4) in a random access process;
when the first information is information for triggering a random access procedure, the first information further comprises a first information element;
wherein the first information element indicates at least one of the following:
first content, wherein the first content is at least one of the following: Message 3 (Msg3) bear uplink data transmission in a random access process, early data transmission (EDT) is supported in a random access process, information about a random access sequence or a random access channel corresponding to the Msg3 bearing uplink data transmission, and information about a corresponding random access sequence or a random access channel supporting EDT; and second content, wherein the second content is at least one of the following: the Msg3 does not bear uplink data transmission in a random access process, EDT is not supported in a random access process, information about a random access sequence or a random access channel corresponding to the Msg3 which does not bear uplink data transmission, and information about a corresponding random access sequence or a random access channel not supporting EDT.

2. The method according to claim 1, when the first information is the Msg4 in a random access process, the first information further comprises a second information element;
wherein the second information element indicates at least one of the following: releasing resources occupied by a first-type channel, and the resources occupied by the first-type channel continue to be valid;
wherein the first-type channel is a channel configured by the base station for the terminal to transmit uplink data in a radio resource control (RRC) idle state or an RRC connect state.

3. The method according to claim 1, wherein the random access procedure comprises a contention based random access procedure, and in a case where the first information indicates triggering the contention based random access procedure and the first information element indicates the first content, the Msg4 or a third information element in the Msg4 sent by the base station indicates at least one of the following: the terminal enters the RRC connect state, and the terminal resides in the RRC idle state;
or, wherein the random access procedure comprises a contention based random access procedure, and the method further comprise: in a case where the first information indicates triggering the contention based random access procedure and the first information element indicates the second content, the Msg4 sent by the base station in the random access procedure comprising a fourth information element; wherein the fourth information element indicates at least one of the following: releasing the resources occupied by the first-type channel, the resources occupied by the first-type channel continue to be valid, and reconfiguration information about the resources occupied by the first-type channel.

4. The method according to claim 1, wherein when the first information is information for triggering a random access procedure, the base station sending first information to a terminal over a downlink channel comprises:
in a case where a first condition is satisfied, the base station sending the first information to the terminal on the downlink channel;
wherein the first condition is at least one of the following: a timer expires, and a first time-domain interval is smaller than or equal to a threshold;
wherein the first time-domain interval is a time-domain interval between a current moment and a start moment or an end moment of resources occupied by a next first-type channel.

5. A method for sending information, comprising:
initiating, by a terminal, a random access procedure;
wherein the random access procedure is triggered by at least one of the following: triggered by the terminal, and triggered by first information sent by a base station to the terminal;
wherein the first information comprises a first information element;

wherein the first information element indicates at least one of the following:
first content, wherein the first content is at least one of the following: Message 3 (Msg3) bears uplink data transmission in a random access process, early data transmission (EDT) is supported in a random access process, information about a random access sequence or random access channel corresponding to the Msg3 bearing uplink data transmission, and information about a corresponding random access sequence or random access channel supporting EDT; and
second content, wherein the second content is at least one of the following: a Msg3 does not bear uplink data transmission in a random access process, EDT is not supported in a random access process, information about a random access sequence or random access channel corresponding to the Msg3 not bearing uplink data transmission, and information about a corresponding random access sequence or random access channel not supporting EDT.

6. The method according to claim 5, wherein the random access procedure comprises a contention based random access procedure, and the method further comprise:
in a case where the terminal initiates the contention based random access procedure, the terminal receiving Message 4 (Msg4) sent by the base station;
wherein the Msg4 comprises a second information element, and the second information element indicates at least one of the following: releasing resources occupied by a first-type channel, and the resources occupied by the first-type channel continue to be valid;
wherein the first-type channel is a channel configured by the base station for the terminal to transmit uplink data in a radio resource control (RRC) idle state or an RRC connect state.

7. The method according to claim 6, further comprising:
in a case where the second information element indicates releasing resources occupied by a first-type channel, the terminal executing the following operation: the terminal enters the RRC connect state;
or, in a case where the second information element indicates that the resources occupied by the first-type channel continue to be valid, the terminal executing at least one of the following operations: the terminal enters the RRC idle state, and the terminal resides in the RRC idle state.

8. The method according to claim 5, wherein the random access procedure comprises a contention based random access procedure, and the method further comprise:
in a case where the first information indicates that the terminal initiates the contention based random access procedure and the first information element indicates the first content, the terminal receiving a Message 4 (Msg4) or a third information element in the Msg4 which is sent by the base station and indicates at least one of the following: the terminal enters a radio resource control (RRC) connect state, and the terminal resides in the RRC idle state.

9. The method according to claim 8, further comprising:
in a case where the Msg4 or the third information element in the Msg4 indicates that the terminal enters the RRC connect state, the terminal releasing first-type channel resources;
or, in a case where the Msg4 or the third information element in the Msg4 indicates that the terminal resides in the RRC idle state, the terminal continuing to use the first-type channel to send uplink data.

10. The method according to claim 5, wherein the random access procedure comprises a contention based random access procedure, and the method further comprise:
- in a case where the first information indicates that the terminal initiates the contention based random access procedure and the first information element indicates the second content, the terminal receiving the Msg4 which is sent by the base station and comprises a fourth information element;
- wherein the fourth information element indicates at least one of the following: releasing the resources occupied by the first-type channel, the resources occupied by the first-type channel continue to be valid, and reconfiguration information about the resources occupied by the first-type channel.

11. The method according to claim 10, further comprising:
- in a case where the fourth information element indicates releasing the resources occupied by the first-type channel, the terminal entering a radio resource control (RRC) connect state;
- or, in a case where the fourth information element indicates that the resources occupied by the first-type channel continue to be valid, the terminal executing the following operations: entering the RRC connect state; and entering the RRC idle state after entering the RRC connect state;
- or, in a case where the fourth information element indicates reconfiguration information about the resources occupied by the first-type channel, the terminal executing the following operations: entering the RRC connect state; entering the RRC idle state after entering the RRC connect state; and in the RRC idle state, sending data on a first-type channel configured by the reconfiguration information about the resources occupied by the first-type channel;
- or, in a case where the first information indicates that the terminal initiates the contention based random access procedure and the first information element indicates the second content, the terminal executing at least one of the following operations: releasing resources occupied by a first-type channel and entering an RRC connect state;
- or, in a case where the first information indicates that the terminal initiates the contention based random access procedure and the first information element indicates the second content, the terminal executing the following operations: entering the RRC connect state; entering the RRC idle state after entering the RRC connect state; and in the RRC idle state, sending data on the first-type channel;
- or, in a case where a first condition is satisfied, the terminal starting to detect the first information sent by the base station on the downlink channel; wherein the first condition is at least one of the following: a timer expires, and a first time-domain interval is smaller than or equal to a threshold; wherein the first time-domain interval is a time-domain interval between a current moment and a start moment or an end moment of resources occupied by a next first-type channel.

12. A method for sending information, comprising:
- before a terminal sends uplink data on a third-type channel, the terminal sending a first signal on a fourth-type channel;
- wherein the first signal is used for notifying a base station that the uplink data will be sent on the third-type channel, a time-domain interval between resources occupied by the fourth-type channel and resources occupied by the third-type channel, and the time-domain interval has a length greater than or equal to 0; or resources occupied by the fourth-type channel are located in resources occupied by the third-type channel;
- wherein at least one of the following is configured by the base station: the resources occupied by the fourth-type channel and a sequence corresponding to the first signal;
- or, wherein at least one of the following is selected from a set of the first signal: the resources occupied by the fourth-type channel, and the sequence corresponding to the first signal of the terminal; wherein the set of the first signal comprises at least one of the following: a first resource set and a first sequence set wherein the first resource set comprises resources occupied by at least one fourth-type channel, and the first sequence set comprises a sequence corresponding to at least one first signal.

13. The method according to claim 12, wherein
- the sets of the first signals to which the first signals corresponding to the terminal satisfying a first condition belong are the same;
- wherein the first condition comprises at least one of the following: the resources occupied by the third-type channel of the terminal are within same time window, resources occupied by start resources or end resources of the third-type channel of the terminal are within same time window, and frequency-domain resources occupied by the third-type channel of the terminal are within same frequency-domain bandwidth;
- preferably, wherein a time-domain position of the first resource set in the set of the first signal is also within the time window.

14. The method according to claim 12, wherein the set of one first signal corresponds to one coverage enhancement level, or the set of one first signal corresponds to the number of repeated transmissions of one third-type channel.

15. The method according to claim 14, wherein at least one of the following is configured by the base station: index information about resources occupied by the fourth-type channel in the first resource set, and index information about the sequence corresponding to the first signal of the terminal in the first sequence set.

16. The method according to claim 14, wherein the set of the at least one first signal corresponds to the resource set occupied by one third-type channel.

17. The method according to claim 16, further comprising:
- determining, by the terminal, the corresponding set of the first signal according to a resource set to which the selected resources occupied by the third-type channel belong; preferably, in a case where the terminal determines the corresponding sets of multiple first signals according to the resource set to which the selected resources occupied by the third-type channel belong, the terminal randomly selecting a set of one first signal;
- or, selecting, by the terminal, resources occupied by the third-type channel from the resource set occupied by the third-type channel corresponding to the selected set of the first signal.

* * * * *